No. 657,334. Patented Sept. 4, 1900.
W. P. CLOTWORTHY.
PACKING BAKING POWDERS.
(Application filed Apr. 10, 1900.)
(No Model.)
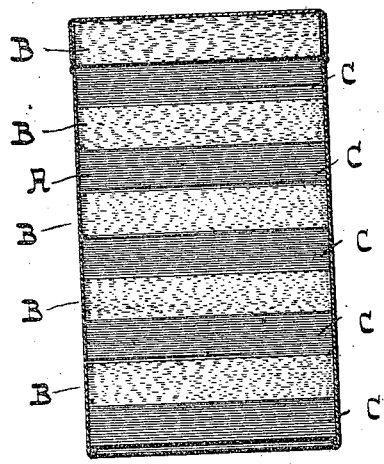
Witnesses:
A. J. Judge
Frank B. Chaplain.
Inventor:
William Pitt Clotworthy,
by W. T. Howard,
Attys.

UNITED STATES PATENT OFFICE.

WILLIAM PITT CLOTWORTHY, OF BALTIMORE, MARYLAND.

PACKING BAKING-POWDERS.

SPECIFICATION forming part of Letters Patent No. 657,334, dated September 4, 1900.

Application filed April 10, 1900. Serial No. 12,310. (No specimens.)

*To all whom it may concern:*

Be it known that I, WILLIAM PITT CLOTWORTHY, of the city of Baltimore, in the State of Maryland, have invented certain Improvements in the Packing of Baking-Powders, of which the following is a specification.

This invention relates to certain improvements in a baking-powder in which the acid and alkaline elements thereof are placed in alternate layers or strata in a packing case or box, as will hereinafter fully appear.

To fully understand the nature of the present invention, it must be remembered that the acid and alkaline elements usually employed in baking-powders to produce carbonic acid gas and form a neutral salt in the bread-making operation range from two and a half to three parts to one, in bulk, respectively, and when they are placed in a box in layers in the proper proportions the layers of the acid constituent will be from two and a half to three times as thick as the alkaline ones. It follows, therefore, that in the removal of a limited quantity of a baking-powder so packed from the box by means of a spoon, which cuts the layers transversely, the proper proportions of the chemical elements in the part removed by the spoon are not obtained and the bread will have an excess of one of the constituents, which results in a diminution of the gas evolved and the production of a salt having either an acid or an alkaline reaction.

The present invention consists in bringing the acid and alkaline layers to a common thickness by the admixture therewith of powdered starch or some other inert equivalent substance in order that when a slice is cut from the main body in the box crosswise of the layers the acid and alkaline elements thereof will be in the proper proportions required.

In the further description of the said invention which follows reference is made to the accompanying drawing, forming a part hereof, and which is a vertical section of an ordinary can containing a baking-powder the elements of which are packed in accordance with the present invention.

In the said drawing, A represents the can, and B and C represent, respectively, the layers of the treated acid and alkaline constituents of the baking-powder alternately arranged. Supposing that to form a neutral salt by the chemical combination of the acid and alkaline elements the acid element consists of three parts, in bulk, and the alkaline element of one part, the addition of one part of starch to the acid and three parts to the alkali will make the two bodies alike in bulk. While I have stated, as an illustration, that one part of starch is mixed with the acid and three parts with the alkaline element of the baking-powder, it is evident that a greater number of parts of starch may be added to each, provided that the relative proportions of the chemicals, as above, are maintained, so as to produce a neutral salt when the elements are chemically combined in the operation of making bread.

In using baking-powder the general practice is to slice out a portion of the baking-powder from the can or box by means of a spoon, which cuts down vertically into the powder, and in such an operation it is evident that when the chemicals are invested with starch in such porportions as to bring the layers to a common thickness no effort or care is required to obtain in the portion of the powder removed the proper relative quantities of the acid and alkaline constituents necessary to ultimately produce a neutral salt and the greatest possible volume of carbonic-acid gas. In the drawing I have shown the powder as divided into ten layers, five of each chemical constituent; but any number of such layers may be used in the box without materially affecting the character of the invention. It is, however, well to have the layers as thin as possible in order to prevent the spoon passing only partially through the last layer entered.

Incidentally the investment of the acid and alkaline elements of the baking-powder with particles of starch reduces the tendency of the chemical constituents where they come in contact to premature chemical combination, as described in Letters Patent No. 462,109, granted to me on the 27th day of October, 1891, and also in Letters Patent No. 647,695, granted to me on the 17th day of April, 1900; but this feature does not form any part of the present invention, which aims to bring the acid and alkaline elements of a baking-powder into alternate layers of a common thickness in a packing-case, in order that in slicing a portion of the powder from the main body in a direction transversely of the layers the relative quantities of the two chemical constituents thereby removed will be such as will produce, when the said elements are chemically combined, a neutral salt, as before stated.

I claim as my invention—

1. In a baking-powder comprising acid and alkali constituents in such proportions that when the same are chemically combined they will form a neutral salt, the admixture with the said chemical constituents, separately, of an inert edible powder in such relative proportions as will bring the treated chemical elements to a common bulk, and the placing of the said treated elements in alternate layers in a packing-case, substantially as specified.

2. A package of baking-powder which consists of alternate layers of acid and alkaline elements the particles of which are invested with an inert edible powder, the relative proportions of the investing powder being such that the alternate layers will have a common depth, thickness or bulk, substantially as and for the purpose specified.

WILLIAM PITT CLOTWORTHY.

Witnesses:
WM. T. HOWARD,
GEO. E. TAYLOR.